(12) United States Patent
Middleton, Jr.

(10) Patent No.: US 7,676,288 B2
(45) Date of Patent: Mar. 9, 2010

(54) PRESENTING CONTINUOUS TIMESTAMPED TIME-SERIES DATA VALUES FOR OBSERVED SUPERVISORY CONTROL AND MANUFACTURING/PRODUCTION PARAMETERS

(75) Inventor: Elliott S. Middleton, Jr., Mission Viejo, CA (US)

(73) Assignee: Invensys Systems, Inc., Foxboro, MA (US)

( * ) Notice: Subject to any disclaimer, the term of this patent is extended or adjusted under 35 U.S.C. 154(b) by 459 days.

(21) Appl. No.: 11/474,048

(22) Filed: Jun. 23, 2006

(65) Prior Publication Data

US 2008/0126408 A1   May 29, 2008

(51) Int. Cl.
*G05B 15/00* (2006.01)

(52) U.S. Cl. .................. 700/83; 702/187; 345/440; 715/703; 715/963

(58) Field of Classification Search ............... 700/83; 702/187; 345/440; 715/703, 963
See application file for complete search history.

(56) References Cited

U.S. PATENT DOCUMENTS

2007/0027888 A1* 2/2007 Avergun et al. ............ 707/101
2007/0027913 A1* 2/2007 Jensen et al. ............. 707/104.1
2007/0157168 A1* 7/2007 Traxel et al. .............. 717/120
2008/0027683 A1* 1/2008 Middleton et al. .......... 702/187

* cited by examiner

*Primary Examiner*—Albert DeCady
*Assistant Examiner*—Steven R Garland
(74) *Attorney, Agent, or Firm*—Leydig, Voit, & Mayer Ltd.

(57) ABSTRACT

A process control and manufacturing information database client application is disclosed displaying received time-series data in an unambiguous manner when a displayed range of time-series data includes a DST transition for a designated time zone for displaying the data. A data acquisition interface obtains timestamped time-series data values for an observed parameter from the process control and manufacturing information database. The data values are requested/received/stored by the client application, for example, according to the UTC time standard. The client application renders the timestamped time-series data values as a series of points on a time-line graph. The time-line graph includes alphanumeric time labels specified in accordance with a designated time zone. The display function renders the time-line graph without disruptions over a time span containing a Daylight Savings Time (DST) transition for the designated time zone.

20 Claims, 6 Drawing Sheets

Spring (Prior Art)

Fig. 4a

Fall (Prior Art)

Fig. 3b

Spring (New)

Fig. 4b

Fall (New)

PRESENTING CONTINUOUS TIMESTAMPED TIME-SERIES DATA VALUES FOR OBSERVED SUPERVISORY CONTROL AND MANUFACTURING/PRODUCTION PARAMETERS

TECHNICAL FIELD

The present invention generally relates to computing and networked data storage systems, and, more particularly, to techniques for managing (e.g., storing, retrieving, processing, etc.) streams of supervisory control, manufacturing, and production information. Such information is typically rendered and stored in the context of supervising automated processes and/or equipment. The data is thereafter accessed by a variety of database clients such as, for example, by trending applications.

BACKGROUND

Industry increasingly depends upon highly automated data acquisition and control systems to ensure that industrial processes are run efficiently and reliably while lowering their overall production costs. Data acquisition begins when a number of sensors measure aspects of an industrial process and report their measurements back to a data collection and control system. Such measurements come in a wide variety of forms. By way of example the measurements produced by a sensor/recorder include: a temperature, a pressure, a pH, a mass/volume flow of material, a counter of items passing through a particular machine/process, a tallied inventory of packages waiting in a shipping line, cycle completions, etc. Often sophisticated process management and control software examines the incoming data associated with an industrial process, produces status reports and operation summaries, and, in many cases, responds to events/operator instructions by sending commands to actuators/controllers that modify operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial action such as move equipment into and out of service as required.

A very simple and familiar example of a data acquisition and control system is a thermostat-controlled home heating/air conditioning system. A thermometer measures a current temperature, the measurement is compared with a desired temperature range, and, if necessary, commands are sent to a furnace or cooling unit to achieve a desired temperature. Furthermore, a user can program/manually set the controller to have particular setpoint temperatures at certain time intervals of the day.

Typical industrial processes are substantially more complex than the above-described simple thermostat example. In fact, it is not unheard of to have thousands or even tens of thousands of sensors and control elements (e.g., valve actuators) monitoring/controlling all aspects of a multi-stage process within an industrial plant or monitoring units of output produced by a manufacturing operation. The amount of data sent for each measurement and the frequency of the measurements varies from sensor to sensor in a system. For accuracy and to facilitate quick notice/response of plant events/upset conditions, some of these sensors update/transmit their measurements several times every second. When multiplied by thousands of sensors/control elements, the volume of data generated by a plant's supervisory process control and plant information system can be very large.

Specialized process control and manufacturing/production information data storage facilities (also referred to as plant historians) have been developed to handle the potentially massive amounts time-series of process/production information generated by the aforementioned systems. An example of such system is the WONDERWARE IndustrialSQL Server historian. A data acquisition service associated with the historian collects time-series data values for observed parameters from a variety of data sources (e.g., data access servers). The collected time-series data is thereafter deposited with the historian to achieve data access efficiency and querying benefits/capabilities of the historian's relational database. Through its relational database, the historian integrates plant data with event, summary, production and configuration information.

Traditionally, plant databases, referred to as historians, have collected and stored in an organized manner (i.e., "tabled"), to facilitate efficient retrieval by a database server, streams of timestamped time-series data values for observed parameters representing process/plant/production status over the course of time. The status data is of value for purposes of maintaining a record of plant performance and presenting/recreating the state of a process or plant equipment at a particular point in time. Significant effort has been expended to ensure that, at the time of acquisition, data is accurately timestamped by synchronized data acquisition points in a distributed enterprise. System designers have gone so far as to install Global Positioning System receivers to synchronize the clocks of the data acquisition points. Each node uses an exact same time frame (e.g., Coordinated Universal Time (UTC), Eastern Standard Time (US), etc.) when assigning timestamps. Thus, when data is accumulated by a historian from a variety of locales across multiple time zones, the information is completely synchronized.

Information is retrieved from the tables of historians and displayed by a variety of historian database client applications including trending and analytical applications at a supervisory level of an industrial process control system/enterprise. Such applications include displays for presenting/recreating the state of an industrial process or plant equipment at any particular point (or series of points) in time. A specific example of such client application is the WONDERWARE ActiveFactory trending and analysis application. This trending and analysis application provides a flexible set of display and analytical tools for accessing, visualizing and analyzing plant performance/status information.

Process historians, and the data sources that provide them with timestamped content that fills their tables, generally operate continuously. Furthermore, it is common practice today for geographically distributed enterprises to have timestamped time-series data values for observed parameters provided by historians to geographically remote client applications anywhere in the world, via the Internet or other long distance data communications networks.

SUMMARY OF THE INVENTION

In accordance with the present invention, a client application coordinates time zone and daylight savings time designations to timestamps associated with received timestamped time-series process data to ensure that the process data, when retrieved and presented to a user by the client application, correctly displays dates/times associated with a series of timestamped data points as a continuum and unambiguously reflects the time zone and the DST in effect for any particular timestamped data point of interest.

The present invention comprises a process control and manufacturing information database client application for displaying received time-series data in an unambiguous manner when a displayed range of time-series data includes a DST transition for a designated time zone for displaying the data. The client application comprises a data acquisition interface for obtaining timestamped time-series data values for an observed parameter from the process control and manufacturing information database. The data values are requested/received/stored by the client application, for example, according to the UTC time standard. The client application also includes a display function for rendering the timestamped time-series data values as a series of points on a time-line graph. The time-line graph includes alphanumeric time labels specified in accordance with a designated time zone. The display function renders the time-line graph without disruptions over a time span containing a Daylight Savings Time (DST) transition for the designated time zone.

In accordance with an aspect of an embodiment of the invention, an interface (e.g., dialog box) is provided that allows users to designate a time-zone context for the labels of the time-line graph that displays the time-series data for a particular time period. In a particular example, the historian client application maintains a record of the time zone currently assigned to various entities including: the historian client application, historian servers (the sources of trending data), and the client machine upon which the historian client application resides. The set of entities and associated time zones are extensible and are user modifiable to include any number of potentially relevant entities (e.g., central headquarters, a remote observation facility, etc.) and their associated time zones.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

A control system/plant historian service supports retrieval operations wherein previously tabled data is provided on demand and in response to client requests. The term "tabled" is used herein to describe data received by the database/historian server and stored in an organized manner to facilitate later retrieval by the database/historian server in response to client requests. The terms "client requests" and "on demand" are intended to be broadly defined. A "client request", unless specifically noted, includes requests initiated by human machine interface users and requests initiated by automated client processes.

Client applications that request and display trending timestamped data provided, for example, by the aforementioned historian server over a designated time span have not adequately addressed presenting data across differing time zones and interruptions/overlaps created by Daylight Savings Time (DST) changes. Process historians generally operate continuously, often archiving data from diverse locations using a synchronized timer/format (e.g., UTC), but also capable of rendering data in a time zone-specific context (such as the time zone of the physical computer upon which a process historian resides). As will be shown by way of graphic illustrations, a historian client application embodying the present invention displays date/time as a non-overlapping and continuous sequence of data values and associated timestamps. The graphical displays of trending data values, for selected status variables, unambiguously incorporate the daylight savings time (DST) in effect for a designated time zone for each displayed time label (e.g., a horizontal axis, a particular data point referenced on a graph, a pointer/slider control, etc.).

Further, the historian client application embodying the present invention supports maintaining/enumerating a set of time zones for a set of entities of particular interest to a user. The entities and their associated time zones are presented, for example, in a dialog box or other suitable enumeration display interface. Thereafter, in an exemplary embodiment a user need only select an entry for an entity in the set of entities in the enumeration display interface to view the historian's information according to the time-frame of the selected entity. Alternatively, the entries merely display an entity and corresponding time zone. A user selects a time zone from a list (e.g., a drop-down list) of time zones using the enumerated entities and their associated time zones as a guide. Examples of such enumerated entities and associated time zones include the historian server, or the client application itself which is presenting the information. In the illustrative embodiment, the configured time zones of the data sources (e.g., historians) and client machine are acquired by the historian client application without user intervention. Therefore users of the historian client application need not know the specific time zone associated with the data sources or the machine upon which the client application resides to view trending data rendered in graphical form by the client application in the time zone context of the particular entity of interest.

Figure 1:
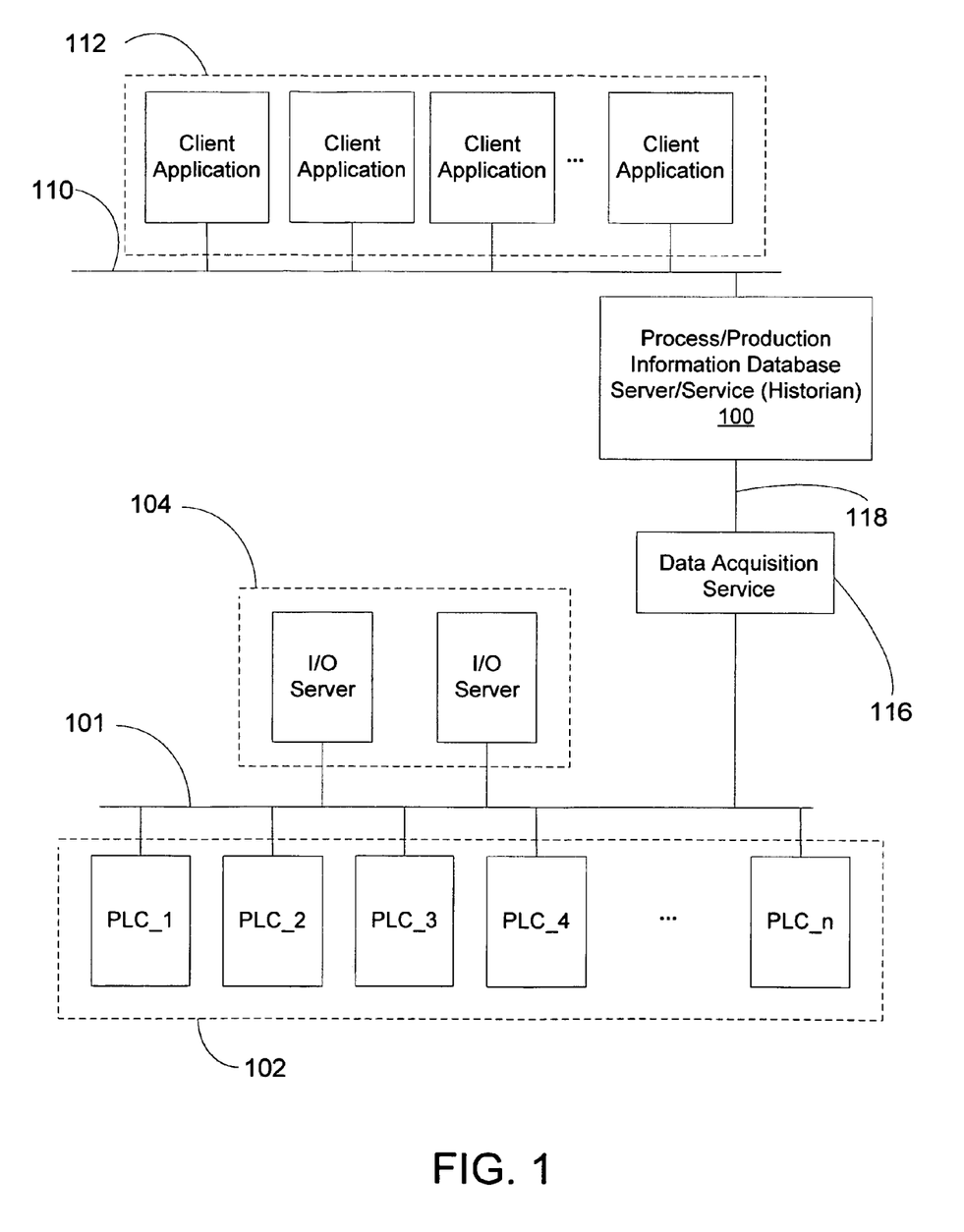
FIG. 1 is a schematic diagram of an exemplary networked environment wherein a process control database client application (e.g., a trending display program) component embodying the present invention is advantageously incorporated.

The following description is based on illustrative embodiments of the invention and should not be taken as limiting the invention with regard to alternative embodiments that are not explicitly described herein. Those skilled in the art will readily appreciate that the illustrative example in FIG. 1 represents a simplified configuration used for illustrative purposes. In particular, the systems within which the present invention is incorporated are substantially larger and the breadth of network connections to client applications greater (including clients that access the historian via an Internet portal server). While the illustrative network arrangement depicts a local area network connection between a historian node and client application nodes, other client applications, located in other time zones than the historian, are connected via wide-area network links to the historian.

FIG. 1 schematically depicts an illustrative environment wherein a supervisory process control and manufacturing/production information data storage facility (also referred to as a plant historian or historian) 100 and historian client applications embodying the present invention are potentially incorporated. The network environment includes a plant floor network 101 to which a set of process control and manufacturing information data sources 102 are connected either directly or indirectly (via any of a variety of networked devices including concentrators, gateways, integrators, interfaces, etc.).

While FIG. 1 illustratively depicts the data sources 102 as a set of programmable logic controllers (PLCs) 1-N, the data sources 102 comprise any of a wide variety of data sources (and combinations thereof) including, for example, programmable logic controllers (PLCs), input/output modules, and distributed control systems (DCSs). The data sources 102, in turn, are coupled to, communicate with, and control a variety of devices such as plant floor equipment, sensors, and actuators. Data received from the data sources 102 potentially represents, for example, discrete data such as states, counters, events, etc. and analog process data such as temperatures, tank levels/pressures, volume flow, etc. A set of I/O servers 104, for example data access servers developed and provided by WONDERWARE, acquire data from the data sources 102 via the plant floor network 101 on behalf of a variety of potential clients/subscribers—including the historian 100.

The exemplary network environment includes a production network 110. In the illustrative embodiment the production network 110 comprises a set of client application nodes 112 that execute, by way of example, trending applications that receive and graphically display time-series values for a set of data points. One example of a trending application is Wonderware's ACTIVE FACTORY application software. The data driving the trending applications on the nodes 112 is acquired, by way of example, from the plant historian 100 that also resides on the production network 110. Alternatively, the client applications reside on non-local nodes communicatively connected to the historian 100 via a wide area network link. The historian 100 includes database services for maintaining and providing a variety of plant/process/production information including historical plant status, configuration, event, and summary information.

A data acquisition service 116, for example WONDERWARE'S remote IDAS, interposed between the I/O servers 104 and the plant historian 100 operates to maintain a continuous, up-to-date, flow of streaming plant data between the data sources 102 and the historian 100 for plant/production supervisors (both human and automated). The data acquisition service 116 acquires and integrates data (potentially in a variety of forms associated with various protocols) from a variety of sources into a plant information database, including timestamped data entries, incorporated within the historian 100.

The physical connection between the data acquisition service 116 and the I/O servers 104 can take any of a number of forms. For example, the data acquisition service 116 and the I/O servers can comprise distinct nodes on a same network (e.g., the plant floor network 110). However, in alternative embodiments the I/O servers 104 communicate with the data acquisition service 116 via a network link that is separate and distinct from the plant floor network 101. In an illustrative example, the physical network links between the I/O servers 104 and the data acquisition service 116 comprise local area network links (e.g., Ethernet, etc.) that are generally fast, reliable and stable.

The connection between the data acquisition service 116 and the historian 100 can also take any of a variety of forms. In an embodiment of the present invention, the physical connection comprises an intermittent/slow connection 118 that is potentially: too slow to handle a burst of data, unavailable, or faulty. The data acquisition service 116 and/or the historian therefore include components and logic for handling streams of time-series data values for observed parameters from components connected to the plant floor network 101. The time-series data received by the historian 100 are preferably assigned timestamps at the point of acquisition rather than at the time of reception by the historian 100 to ensure the values are properly sequenced. Furthermore, the points of acquisition preferably utilize synchronized clocks (e.g., GPS clock signal) to ensure that all sources of data accurately assign timestamps to their data prior to submission to the historian 100 (via the data acquisition service 116).

Figure 2:
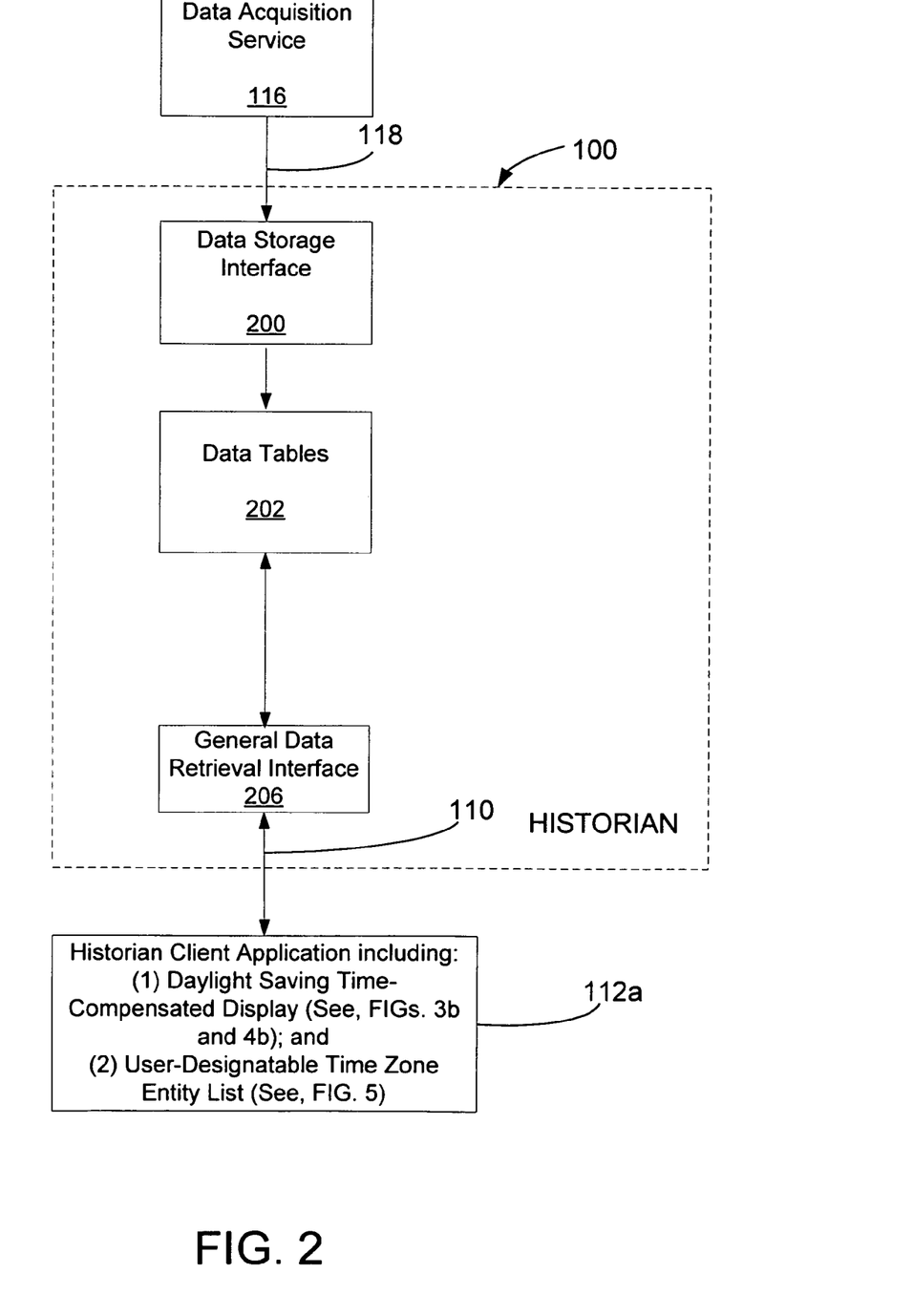
FIG. 2 is a schematic drawing of functional/structural aspects of a historian server/service embodying the present invention.

Turning to FIG. 2 an exemplary schematic diagram depicts functional components associated with the historian 100 and a client application, having an associated data acquisition interface for obtaining time-series data values for observed parameters from the historian 100, on node 112a. The historian 100 generally implements a storage interface 200 comprising a set of functions/operations for receiving and tabling data from the data acquisition service 116 via connection 118. The received data is stored in one or more tables 202 maintained by the historian 100.

By way of example, the tables 202 include time-series pieces of data values for observed parameters received by the historian 100 via a data acquisition interface to a process control/production information network such as the data acquisition service 116 on network 101. In the illustrative embodiment each piece of data is stored in the form of a value, quality, and timestamp. These three parts to each piece of data stored in the tables 202 of the historian 100 are described briefly herein below.

Timestamps

The historian 100 tables data received from a variety of "real-time" data sources, including the I/O Servers 104 (via the data acquisition service 116). The historian 100 is also capable of accepting "old" data from sources such as text files. By way of example, "real-time" data can be defined to exclude data with timestamps outside of ±30 seconds of a current time of a clock maintained by a computer node hosting the historian 100. However, data characterizing data is also addressable by a quality descriptor associated with the received data. Proper implementation of timestamps requires synchronization of the clocks utilized by the historian 100 and data sources. In an exemplary embodiment, all data values are assigned UTC timestamps. However, this is not essential for carrying out the present invention. The client application need only know, through implicit/explicit designation, the time zone assigned to the timestamp for a data point value.

Quality

The Historian 100 supports two descriptors of data quality: "QualityDetail" and "Quality." The Quality descriptor is based primarily on the quality of the data presented by the data source, while the QualityDetail descriptor is a simple indicator of "good", "bad" or "doubtful", derived at retrieval-time. Alternatively, the historian 100 supports an OPCQuality descriptor that is intended to be used as a sole data quality indicator that is fully compliant with OPC quality standard(s). In the alternative embodiment, the QualityDetail descriptor is utilized as an internal data quality indicator.

Value

A value part of a stored piece of data corresponds to a value of a received piece of data. In exceptional cases, the value obtained from a data source is translated into a NULL value at the highest retrieval layer to indicate a special event, such as a data source disconnection. This behavior is closely related to quality, and clients typically leverage knowledge of the rules governing the translation to indicate a lack of data, for example by showing a gap on a trend display.

The following is a brief description of the manner in which the historian 100 receives time-series data for observed parameters from a real-time data source and stores the data as a timestamp, quality and value combination in one or more of its tables 202. The historian 100 receives a data point for a particular tag (named data value) via the storage interface 200. The historian compares the timestamp on the received data to: (1) a current time specified by a clock on the node that hosts the historian 100, and (2) a timestamp of a previous data point received for the tag. If the timestamp of the received data point is earlier than, or equal to the current time on the historian node then:

- If the timestamp on the received data point is later than the timestamp of the previous point received for the tag, the received point is tabled with the timestamp provided by the real-time data source.
- If the timestamp on the received data point is earlier than the timestamp of the previous point received for the tag (i.e. the point is out of sequence), the received point is tabled with the timestamp of the previously tabled data point "plus 5 milliseconds". A special QualityDetail value is stored with the received point to indicate that it is out of sequence (the original quality received from the data source is stored in the "quality" descriptor field for the stored data point).

On the other hand, if the timestamp of the point is later than the current time on the historian 100's node (i.e. the point is in the future), the point is tabled with a timestamp equal to the current time of the historian 100's node. Furthermore, a special value is assigned to the QualityDetail descriptor for the received/tabled point value to indicate that its specified time was in the future (the original quality received from the data source is stored in the "quality" descriptor field for the stored data point).

The historian 100 can be configured to provide the timestamp for received data identified by a particular tag. After proper designation, the historian 100 recognizes that the tag identified by a received data point belongs to a set of tags for which the historian 100 supplies a timestamp. Thereafter, the timestamp of the point is replaced by the current time of the historian 100's node. A special QualityDetail value is stored for the stored point to indicate that it was timestamped by the historian 100. The original quality received from the data source is stored in the "quality" descriptor field for the stored data point.

As will be appreciated from the above-discussion, the historian 100 is capable of storing timestamped data in a variety of ways. This variability extends to handling of time zones associated with the timestamps. In an exemplary embodiment the historian 100 assigns timestamps for received/tabled data values according to a single configured time zone standard. By way of example, the time zone used to store the time stamped data is based upon the currently configured time zone of a database server machine (or machines) upon which the historian 100 operates. Alternatively, the time zone is based upon a user-configured selection that overrides the time zone presently associated with a server machine. Yet other embodiments of the historian 100 utilize the UTC time zone standard.

In an illustrative embodiment, the time zone associated with data stored within the historian 100 is inconsequential to a historian client application because the historian server provides the requested data according to a requested time zone. By way of example, the client application requests and receives data according to the UTC time zone standard. In an alternative embodiment the historian client application converts the timestamped data, upon receipt from the historian, to a single standardized time zone (e.g., UTC). Requesting/receiving data from the historian according to a particular time zone (e.g., UTC) and/or converting a time zone for timestamped data at the time of storing data received from the historian 100, so that the received data is stored according to the particular time zone (e.g., UTC) is separate and distinct from applying a designated time zone when a trending application displays a sequence of such previously stored timestamped data values for one or more monitored parameters/variables of a process or manufacturing operation.

It is also noted that in an exemplary embodiment the historian 100 supports application of a rate deadband filter to reject new data points for a particular tag where a value associated with the received point has not changed sufficiently from a previous stored value for the tag.

Having described a data storage interface for the historian 100, attention is directed to retrieving the stored data from the tables 202 of the historian 100. Access, by data acquisition interfaces of clients of the historian 100, to the stored contents (e.g., time-series data values for observed parameters) of the tables 202 is facilitated by a retrieval interface 206. The retrieval interface 206 exposes a set of functions/operations/methods callable by the data acquisition interfaces of client applications residing on client nodes attached to the network 110 (e.g., a trending client application executing on node 112a), for querying the contents of the tables 202.

In response to receiving a query message, the retrieval interface 206 supplies timestamped series data to the requesting client application. In an exemplary embodiment, the timestamps for the data provided via the retrieval interface 206 of the historian are based upon any time zone standard specified by the client application (e.g., UTC). The client applications, by way of example, request and store time-series data values from the retrieval interface 206 of the historian 100 according to a single time zone standard (e.g., UTC). Alternatively, the client applications convert the timestamps of received time-series data values to the single time zone standard upon receipt from the historian 100. Thereafter, the client applications present the timestamped data via a graphical display with time labels based upon a designated presentation time zone that is potentially different from the time zone standard used to store the data on the client application's machine.

In order to display the data in a meaningful manner, when presenting the received data series to a user, the client application on node 112a converts the received timestamped data series times in accordance with a configurable, user-designatable time zone entity selected via a time zone configuration dialog/interface (see, e.g., FIG. 5 described herein below). Furthermore, as depicted in FIGS. 3a, 3b, 4a and 4b, the display aspect of the historian client application on node 112a, and in particular the method for assigning time labels to the time axis and plotted data points, also accounts for any/all time shifts (i.e., overlaps/gaps arising from changes between DST and standard times that occur during a time span for which a time-series of values are presented by the historian client application. Thus, no overlaps (i.e., apparent time reversal)/discontinuities (i.e., apparent time skip) are present in a graphical display (e.g., line graph) of a series of point values, either connected or unconnected by line segments, over a period of time including a DST status change for a particular time zone.

Figure 3A:
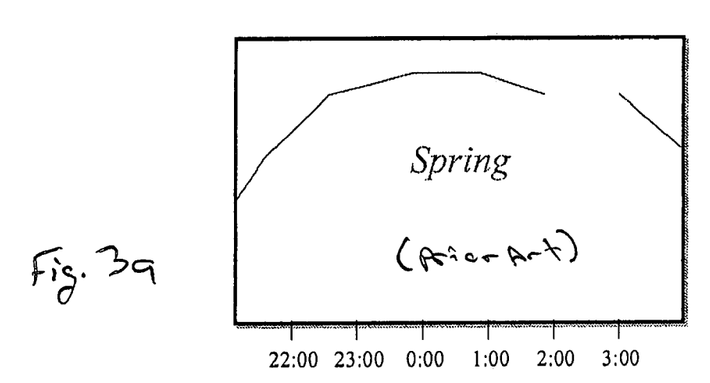
FIGS. 3a and 3b depict exemplary output displays of time-based line graphs corresponding, respectively, to prior art and new daylight savings time (DST) status change handling for a transition from Standard time to DST.

Turning to FIG. 3a a partial view of a prior art version line chart ending at 4:00 a.m. on Apr. 3, 2005, (the day of a DST status change in North America) is depicted including a set of data point values connected, for the most part, by line segments. FIG. 3a shows a displayed set of time-series data values for an observed parameter beginning at 21:00 on Apr. 2, 2005, and ending at 4:00 on Apr. 3, 2005. However, due to the DST status change, the displayed line graph, including a connected set of line segments, is disrupted in the time range from just after 2:00 to 3:00 because the hour commencing at 2:00 does not exist on that date for the particular selected time zone. For a user who is not aware of the DST status change, this discontinuity appears as period of unknown values for the parameter for a period of one hour. The gap depicted in FIG. 3a creates a potentially misleading impression that no data was available for a one-hour period. In actuality, the hour simply did not exist for the particular designated time zone. In yet another prior art display, the gap between 2:00 and 3:00 is filled by a straight line connecting the two endpoints of the gap depicted in FIG. 3a—creating an impression that the value did not change during the hour.

Figure 3B:
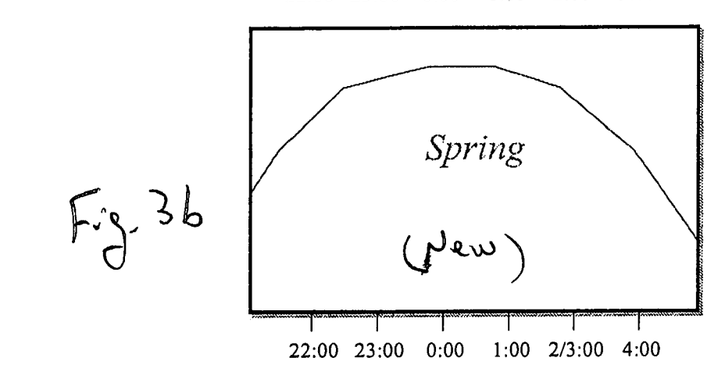

Turning to FIG. 3b, a display over the same time period depicts a preferable way of handling a DST status change ("transition") that eliminates the gap—without creating a misleading impression regarding the existence of data over a particular period of time. In particular, rather than showing the skipped hour (at 2:00 a.m. on Apr. 3, 2005) as a gap in the line chart, the data values for the observed parameter are positioned on the time-line graph as a continuum according to, for example, their UTC time values and are therefore unaffected by a DST transition occurring over a designated time span and time zone. However, alphanumeric time labels on the line chart depicted in FIG. 3b are assigned according to a currently designated time zone for the client application. The time labels correspond to UTC time values adjusted in accordance with the designated time zone and incorporate the "skipped" hour during the DST transition. The timeline on the horizontal axis of the graph is labeled 3:00 rather than 2:00 to eliminate the one hour gap created by the change to daylight savings time at 2:00 a.m. on Apr. 3, 2005. Merely labeling the point of transition with "3:00" could create an impression that the time span between 1 and 3 has been warped/compressed. Alternatively, as shown in FIG. 3b a "2" is placed along-side the "3:00" label on the horizontal axis of the graph to provide a special indication of the standard/DST transition to an observer of the display. This special case time label informs the user of the standard/DST transition through explicit representation of the time change and avoids a mistaken impression that the time span between 1:00 and 3:00 has been warped (proportionally compressed) during the display process.

Figure 4A:
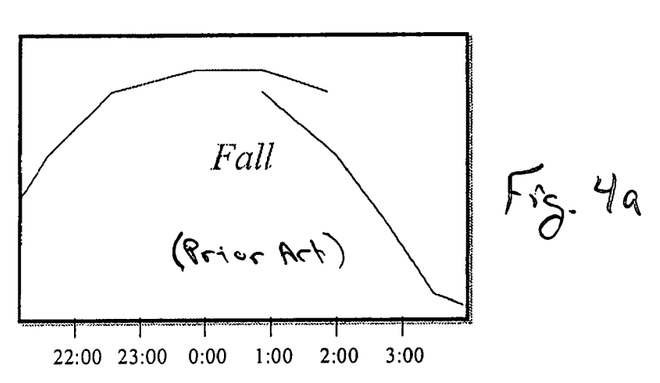
FIGS. 4a and 4b depict exemplary output displays of line graphs corresponding, respectively, to prior art and new DST status change handling for a transition from DST to Standard time.

Similarly, turning to FIG. 4a, a hypothetical partial view of a prior art version line chart ending at 4:00 a.m. on Oct. 30, 2005, (the day of a DST status change) is depicted. FIG. 4a shows a displayed set of time-series data values for an observed parameter provided by the historian 100 for a period of eight hours—beginning at 21:00 on Oct. 29, 2005, and ending at 4:00 a.m. on Oct. 30, 2005. However, due to the DST status change, the displayed line graph including a connected set of line segments includes a disruption and overlapping period in a connected set of line segments during a period of one hour from 1:00 a.m. to 2:00 a.m. due to a change back to standard time upon commencement of the initial 2:00 hour. The overlap arises from the hour between 1:00 and 2:00 being repeated (after a change from DST to standard time) in a designated time zone during a selected display period. Again, such a line graph can be disconcerting to a user and potentially creates problems for a historian client analytical application that expects only a single (actual/estimated) value for an observed parameter at any displayed time. In the illustrative embodiment, the actual data values are connected by line segments. However, further confusion potentially arises if the data points are not joined and are relatively sparse. In that case, the observer of the presented graph may assume that the data values were fluctuating between high and low values during the overlapping time period. In another prior art display, the two endpoints of the line graph are joined at their point of disruption by a single straight line. However, such line segment does not preclude user confusion.

Figure 4B:
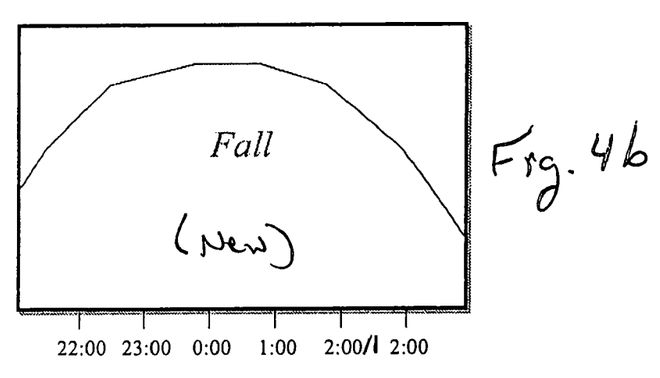

Turning to FIG. 4b, a display over the same time period depicts a preferable way of handling of a DST status change that eliminates the overlap disruption—without creating confusion regarding the validity of the acquired data. In particular, rather than showing the overlapped hour as two overlapping line segments (between 1:00 to 2:00 on Oct. 30, 2005), data values for the observed parameter are positioned on the time line graph as a continuum according to, for example, their UTC time values and are therefore unaffected by a DST transition occurring over a designated time span and time zone. However, the alphanumeric time labels on the horizontal axis of the line chart depicted in FIG. 4b are assigned according to a currently designated time zone for the client application. The time labels correspond to UTC time values adjusted in accordance with the designated time zone and incorporate the "repeated" hour arising from the DST transition. The data values for an observed parameter are positioned on the time-line graph as a continuum according to, for example, their UTC time values and are therefore unaffected by a DST transition occurring within a designated time span and time zone. Furthermore, each alphanumeric time label on the graph depicted in FIG. 4b is separately generated by converting a UTC-based (or other continuous time standard) time value according to the currently designated time zone. Thus, the horizontal (time) axis is labeled with time reference labels/markers to identify the time change back to standard time upon commencement of the first 2:00 a.m. hour on Oct. 30, 2005.

The presence of two, "2:00" time labels on the horizontal graph may create user confusion. Therefore, in an alternative embodiment, a "1" is placed along-side the "2:00" label on the horizontal axis of the graph to provide a special indication of the DST/standard transition to an observer of the display.

As mentioned previously herein above, an exemplary historian client application assigns time labels for retrieved data for viewing by a user based upon a designated time zone (or alternatively an entity with an affiliated time zone). The historian client application, prior to presenting any time label for a line chart on a display, converts the label from a continuous base time zone (e.g., UTC) used to determine point positions on the graph to a currently designated time zone that may include disruptions due to DST transitions. The conversion includes applying any applicable DST status changes associated with the designated time zone. The actual data points are plotted/presented along a time continuum (without either gaps or overlaps) on the time-line graph including the converted labels. In an exemplary embodiment, plotting the data points as a continuum is achieved by utilizing their assigned UTC values to plot their positions on a time-line graph. The actual method/order of execution for generating the plot of data points, without discontinuities or overlaps, and assigning time labels to a time axis of the graph varies in accordance with embodiments of the invention.

Figure 5:
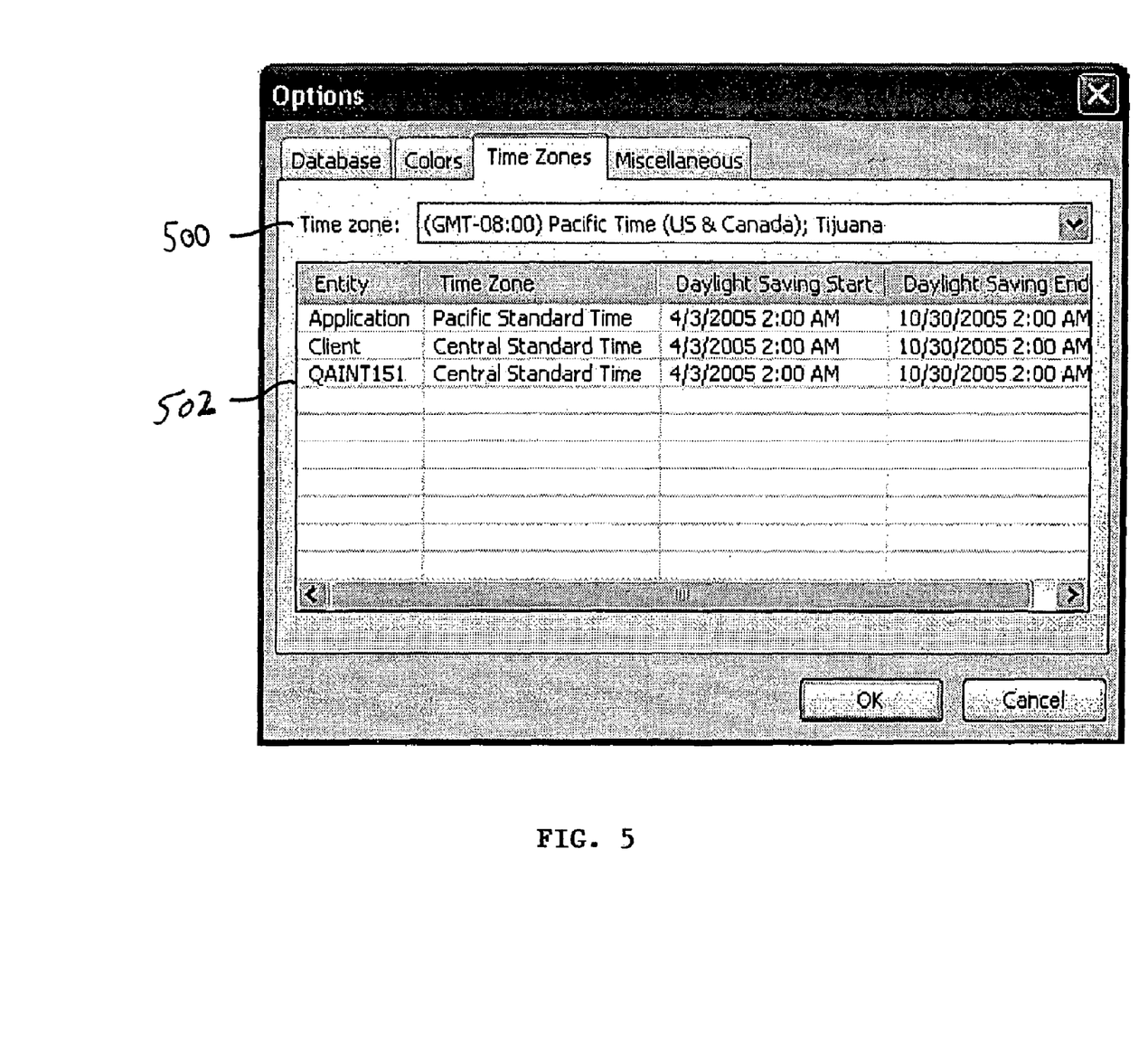
FIG. 5 is an exemplary graphical user interface associated with designating a time zone context for presenting time-series data received from a historian by selecting an entity.

Turning to FIG. 5, a time zone designation aspect of the illustrative embodiment is presented by way of an exemplary user interface (dialog box). In particular, an exemplary embodiment of the historian client application includes a time zone configuration interface that supports user-designation of a time zone for a current display in a variety of ways. A time zone field 500 supports a user arbitrarily selecting any one of a set of previously defined time zones throughout the world (enumerated in a drop-down listing anchored by the time zone field 500). The user designates one of the enumerated time zones listed within the drop-down list control of the time zone field. In an exemplary embodiment, a list of entities and associated time zones are provided in a list field 502 to aid selection of one of the enumerated time zones. In an exemplary embodiment, the list field 502 is automatically populated by the historian client application to include: a currently designated time zone for the historian client application ("Application"), a client machine ("Client") upon which the historian client application resides, and a historian server ("QAINT151") to which the client application is presently connected. If the historian client application is connected to multiple historian servers, then each is listed in the list field 502. In an exemplary embodiment, the list field 502 provides a listing of the aforementioned entities and their associated "time zone/DST status" and DST start/end information. The list field 502 is, by way of example, merely informational. A user can utilize the listed entities and time zone information to designate a time zone from the drop down list of within the time zone field 500.

However, in an alternative embodiment, additional functionality is associated with the list field 502. First, the list field 502 of the historian client application is configurable/extensible to allow a user to add any desired further "entity" entries and specified time zone and DST transition dates/times. Thus, the configurable/extensible list 502 supports identifying a time zone context (thereafter designated in the time zone field 500) for displaying continuous time-series (e.g., trend) data in cases where a user is aware of a particular listed entity for which a time context is desired. However, the user need not know the particular time zone within which the entity resides and/or the DST status for the entity.

Figure 6A:
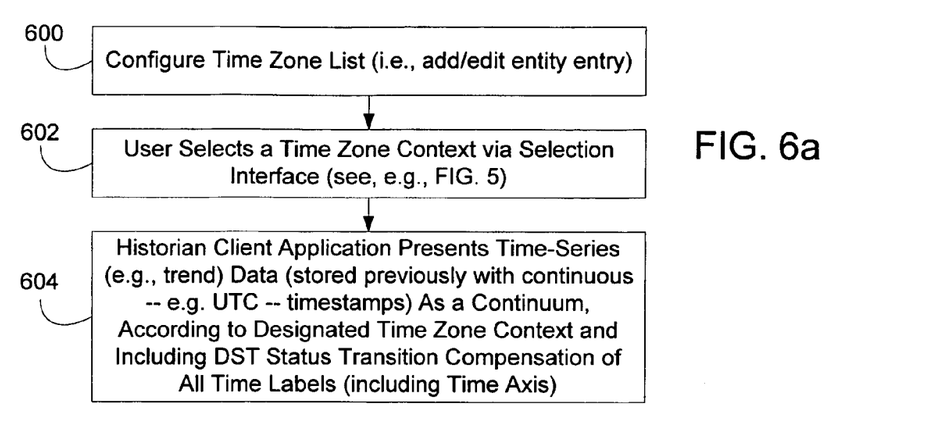
FIGS. 6a and 6b are flow diagrams depicting the general steps performed to carry out data presentation as a continuum by a historian client application using the time-zone selection and DST status compensating features illustratively depicted in FIGS. 3b, 4b and 5.

Having described an exemplary functional/structural arrangement for a historian incorporating time-zone context configuration and presentation features, attention is directed to a flow diagram summarizing states representing the general operation of the historian client application (running on node 112*a*) identified in FIG. 2 with regard to specifying times for time-series (e.g., trend) data received from the historian 100 and displayed as a continuum on a line graph that potentially includes a DST transition. Turning to FIG. 6*a*, in an exemplary embodiment, during stage 600 the configurable/extensible list 502 is optionally configured to include one or more entity names and corresponding time zone conversion and DST status transition information. The historian client application automatically populates the list with certain entities including: the historian client application itself (with the currently designated time zone); the client machine upon which the client application resides; and a set of one or more connected historian servers from which the client application receives timestamped data. In an enhanced exemplary embodiment, a user can configure additional entries to include any of a variety of chosen entries such as "headquarters", "plant X", etc. Configuring an entity name entry, and associating the entity name entry with a particular time zone, enables users of a client application to view a set of data points within the context of a designated entity located at a distant location without knowledge of the entity's location and/or time zone.

At stage 602 a user of the historian client application, via the time zone designation interface depicted in FIG. 5, selects an appropriate time zone context for the historian client application for displaying time-series data values (provided for example by the historian 100) for designated variables over a specified time span. In an exemplary embodiments the time zone context is designated by selecting a time zone from the drop-down list accessed via the time zone field 500. The list field 502 is informational and is used as a guide for a user when selecting a time zone from the drop-down list provided by the time zone field 500. Furthermore, in an exemplary embodiment, a user designates a time zone for the historian client application (the first entry in the list field 502 by selecting an entry from one of the remaining entries (e.g., client machine, a listed historian server, etc.) in the list of entities enumerated in list field 502.

Thereafter, during stage 604 the client application presents/positions time-series data point values for selected parameters/variables over a designated time span (potentially including a DST transition) as a continuum—i.e. without gaps/overlaps at DST transitions—on a time-line graph. The positions of the data point values along a time axis of the time-line graph are determined, as noted above, in accordance with a continuous (uninterrupted/non-repeated) time span associated with the graph. In an exemplary embodiment, the data values are stored by the client application with UTC timestamps—which do not contain DST transitions/discontinuities. The data points are thereafter positioned on the line graph according to their UTC timestamp values. Laying out the data values on a graph according to their UTC timestamp values avoids DST transition gaps/overlaps. As shown in FIGS. 3*b* and 4*b*, such continuous/non-overlapped time span is not affected by any intervening DST transitions.

Furthermore, during stage 604, the time labels/text assigned to various elements (e.g., time division markers on the horizontal axis, slider bar, etc.) of the displayed graph are generated by applying the client application's current time zone context, designated during stage 602, to each UTC time value. Thus, if a selected time span for a designated time zone context traverses a DST status change, then one or more labels falling on or after the DST transition are positioned along the graph's horizontal (time) axis according to their UTC values in relation to the continuous (i.e., uninterrupted/non-overlapping) time span represented by the graph; however, the corresponding alphanumeric string for any label is generated based upon the currently selected time zone context. In accordance with various embodiments of the invention, any continuous (non-interrupted) timing convention serves as the basis for storing data values and marking the relative temporal positions between a beginning/end of a time span represented in a displayed time-line graph. Such values are converted according to a specified time zone context when generating time labels on the displayed graph.

Figure 6B:
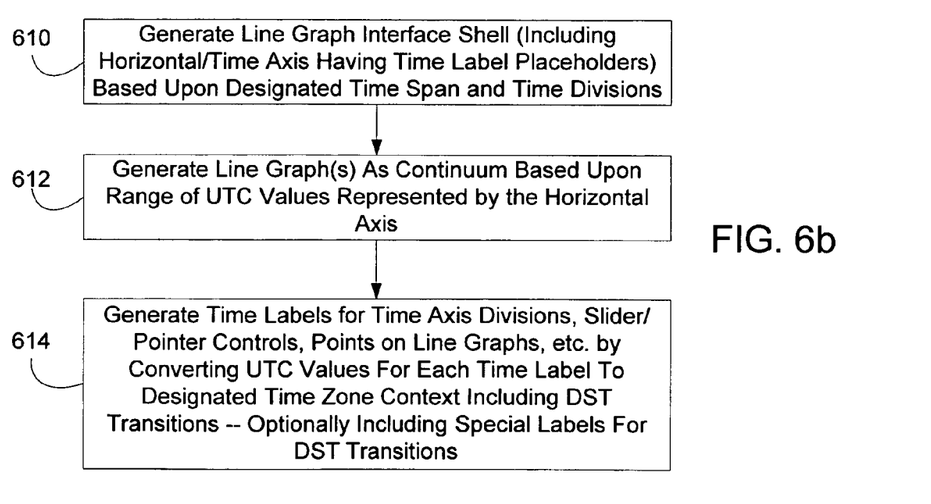
Figure 7:
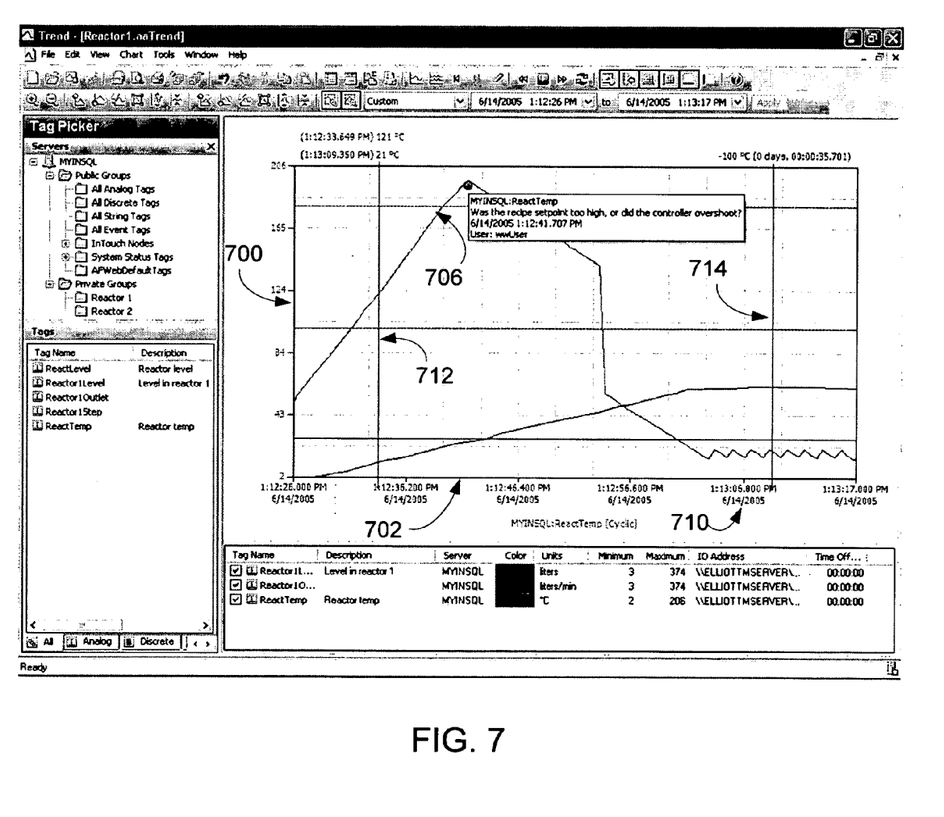
FIG. 7 is an exemplary graphical user interface depicting a time sequenced graphical representation of a variable value and associated time labels assigned in accordance with the steps summarized in FIGS. 6a and 6b.

Turning to FIG. 6*b* and FIG. 7, an exemplary set of steps are summarized for generating a continuous/non-overlapping time-line graph (comprising a set of data points positioned according to their UTC timestamps and connected by line segments) during stage 604 in accordance with an illustrative embodiment of the present invention. Initially, during step 610 a line graph interface shell is created by the client application. The shell includes, by way of example, a vertical axis 700 identifying a scale for presenting data point values. A horizontal graph axis 702 (including time division markers placed thereon) is generated based upon a set of specified values including an uninterrupted/non-overlapping time span for which a time-series set of point values are to be displayed. The time span represented by the beginning and end of the horizontal graph axis 702 is based upon actual elapsed time (e.g., UTC time span) rather than a time period for a particular time zone potentially including a gap or overlap arising from a DST transition falling within the selected time span for a selected time zone context. A set of time span division markers are placed at evenly spaced locations on the horizontal axis 702 of the graph according to actual elapsed continuous time, without DST transition disruptions. The markers establish positions for time labels. The alphanumeric time labels, in contrast to the division markers, are based upon times that are generated according to a currently specified time zone context and any associated DST transitions. Thus, the alphanumeric label values (see, step 614 below) are obtained by converting UTC time values (or any other uninterrupted time standard that is not subject to DST transitions) according to a currently designated time zone (including adjustments for time zone transitions).

At step 612 the historian client application generates one or more lines (706) representative of values for one or more data points over the designated time span. The position of the data points along the horizontal (time) axis is based upon actual elapsed time from the beginning of the designated time period and do not take into consideration DST transitions for a selected time zone context. In an exemplary embodiment, the positions of data points on the graph are based upon the UTC timestamps stored with the data points upon receipt from a historian server.

At step 614 the historian client application generates alphanumeric time labels for the line graph. In contrast to the placement of data points and time divisions on the graph during steps 610 and 612, the text time labels generated and displayed on the graph during step 614 take into consideration the historian client application's currently designated time zone context and any DST transitions falling within the continuous time span of the graph. Examples of labels generated during step 614 include time division marker times (710), slider data value selection controls (712, 714), specific data points representing actual data point values provided by the historian—as opposed to values falling on a line connecting two actual data point values.

Furthermore, in an illustrative example, if a DST transition falls within a displayed time span, then an appropriate label is generated for that point in time on the horizontal axis of the graph to prevent user confusion arising from the DST transition (gap/overlap). One way to provide a label to avoid such confusion is by providing two, side-by-side, values at any transition—as shown in FIGS. 3b and 4b. Other ways of visually depicting DST transitions are contemplated including the use of symbolic markers at such transitions to ensure proper interpretation of the line graphs. The time zone context is established, as mentioned above, by a user selecting the time zone directly from the drop-down list of the time zone field 500. The choice of time zone is guided, for example by the contents of the entries of the list field 502. In an alternative embodiment, a user can indirectly designate a time zone (thereafter presented in time zone field 500) by specifying (e.g., double clicking) a system entity entry in the list field 502 for which a time zone has been previously assigned In view of the many possible embodiments to which the principles of this invention may be applied, it should be recognized that the embodiments described herein with respect to the drawing figures, as well as the described alternatives, are meant to be illustrative only and should not be taken as limiting the scope of the invention. The functional components disclosed herein can be incorporated into a variety of programmed computer systems as computer-executable instructions (provided on a computer-readable medium) in the form of software, firmware, and/or hardware. Furthermore, the illustrative steps may be modified, supplemented and/or reordered without deviating from the invention. Therefore, the invention as described herein contemplates all such embodiments as may come within the scope of the following claims and equivalents thereof.

What is claimed is:

1. A computer system having computer readable medium including computer-executable instructions comprising a process control and manufacturing information database client application for displaying received time-series data, the client application comprising:
   a data acquisition interface for obtaining timestamped time-series data values for an observed parameter from the process control and manufacturing information database; and
   a display function for rendering the timestamped time-series data values as a series of points on a time-line graph including alphanumeric time labels specified in accordance with a designated time zone, and the display function renders the time-line graph without disruptions over a time span containing a Daylight Savings Time (DST) transition for the designated time zone.

2. The computer system of claim 1, the display function positioning the series of points on the time-line graph according to a first time convention having no disruptions over the time span containing the DST transition for the designated time zone.

3. The computer system of claim 2, the first time convention comprising coordinated universal time (UTC).

4. The computer system of claim 1 further comprising:
   a time zone designation interface comprising a list of named entities and associated time zone identification information.

5. The computer system of claim 4, the list of named entities including the database client application.

6. The computer system of claim 4, the list of named entities including a client machine upon which the database client application resides.

7. The computer system of claim 4, the list of named entities including a database server to which the database client application is connected.

8. The computer system of claim 1 further including a special time label provided to identify the DST transition on a time axis of the time-line graph.

9. A method for displaying, by a process control and manufacturing information database client application, received time-series data, the method comprising the steps of:
   obtaining, by a data acquisition interface of the client application, timestamped time-series data values for an observed parameter from the process control and manufacturing information database; and
   rendering, by a display function of the client application, the timestamped time-series data values as a series of points on a time-line graph including alphanumeric time labels specified in accordance with a designated time zone, and during the rendering step the display function renders the time-line graph without disruptions over a time span containing a Daylight Savings Time (DST) transition for the designated time zone.

10. The method of claim 9, the rendering step comprising positioning the series of points on the time-line graph according to a first time convention having no disruptions over the time span containing the DST transition for the designated time zone.

11. The method of claim 10, the first time convention comprising coordinated universal time (UTC).

12. The method of claim 9 further comprising:
presenting, via a time zone designation interface, a list of named entities and associated time zone identification information.

13. The method of claim 9, the rendering step comprising providing a special time label, on the time axis of the time-line graph, to identify the DST transition.

14. A computer readable medium including computer-executable instructions for displaying, by a process control and manufacturing information database client application, received time-series data, the computer-executable instructions facilitating performing the steps of:
obtaining, by a data acquisition interface of the client application, timestamped time-series data values for an observed parameter from the process control and manufacturing information database; and
rendering, by a display function of the client application, the timestamped time-series data values as a series of points on a time-line graph including alphanumeric time labels specified in accordance with a designated time zone, and during the rendering step the display function renders the time-line graph without disruptions over a time span containing a Daylight Savings Time (DST) transition for the designated time zone.

15. The computer-readable medium of claim 14, the rendering step comprising positioning the series of points on the time-line graph according to a first time convention having no disruptions over the time span containing the DST transition for the designated time zone.

16. The computer-readable medium of claim 15, the first time convention comprising coordinated universal time (UTC).

17. The computer-readable medium of claim 14 further comprising computer-executable instructions for facilitating:
presenting, via a time zone designation interface, a list of named entities and associated time zone identification information.

18. The computer-readable medium of claim 17, the list of named entities including a client machine upon which the database client application resides.

19. The computer-readable medium of claim 17, the list of named entities including a database server to which the database client application is connected.

20. The computer-readable medium of claim 14, the rendering step comprising providing a special time label, on the time axis of the time-line graph, to identify the DST transition.

* * * * *